US011990670B2

(12) United States Patent
Smith

(10) Patent No.: US 11,990,670 B2
(45) Date of Patent: May 21, 2024

(54) DIRECT AIR-TO-GROUND ANTENNA SYSTEMS FOR AIRCRAFT

(71) Applicant: Airbus SAS, Blagnac (FR)

(72) Inventor: Leslie Smith, Leguevin (FR)

(73) Assignee: Airbus SAS, Blagnac (FR)

( * ) Notice: Subject to any disclaimer, the term of this patent is extended or adjusted under 35 U.S.C. 154(b) by 303 days.

(21) Appl. No.: 17/439,086

(22) PCT Filed: Mar. 13, 2020

(86) PCT No.: PCT/IB2020/052330
§ 371 (c)(1),
(2) Date: Sep. 14, 2021

(87) PCT Pub. No.: WO2020/188450
PCT Pub. Date: Sep. 24, 2020

(65) Prior Publication Data
US 2022/0158333 A1 May 19, 2022

Related U.S. Application Data

(60) Provisional application No. 62/818,973, filed on Mar. 15, 2019.

(51) Int. Cl.
*H01Q 1/28* (2006.01)
*H01Q 3/44* (2006.01)
(Continued)

(52) U.S. Cl.
CPC ............... *H01Q 1/28* (2013.01); *H01Q 3/446* (2013.01); *H01Q 9/42* (2013.01); *H01Q 19/32* (2013.01); *H01Q 21/26* (2013.01); *H01Q 21/29* (2013.01)

(58) Field of Classification Search
CPC ............ H01Q 1/28; H01Q 9/42; H01Q 21/26; H01Q 21/29; H01Q 19/32; H01Q 3/446
(Continued)

(56) References Cited

U.S. PATENT DOCUMENTS 8,447,292 B2 * 5/2013 Chari ....................... H01Q 9/32
455/448
8,447,929 B2 5/2013 Olszewski et al.
(Continued)

FOREIGN PATENT DOCUMENTS

EP 3432417 A1 1/2019

OTHER PUBLICATIONS

International Preliminary Report on Patentability from corresponding PCT application No. PCT/IB2020/052330, dated Sep. 30, 2021.
(Continued)

*Primary Examiner* — Hai V Tran
(74) *Attorney, Agent, or Firm* — Greer, Burns & Crain, Ltd.

(57) ABSTRACT

An antenna system for an aircraft, comprising one or more antennas configured and arranged on the aircraft to provide a downlink rate of at least one Gbps, the one or more antennas permitting a base cell tower placement with a diameter of at least 60 km, the one or more antennas being configured and arranged to support multiple data streams simultaneously, the one or more antennas supporting multiple polarizations, the one or more antennas having a high gain over most of a hemisphere around the one or more antennas of $-85° \leq \theta \leq 85°$, $0° \leq \varphi \leq 360°$.

12 Claims, 14 Drawing Sheets

(51) Int. Cl.
*H01Q 9/42* (2006.01)
*H01Q 19/32* (2006.01)
*H01Q 21/26* (2006.01)
*H01Q 21/29* (2006.01)

(58) Field of Classification Search
USPC .................................................... 343/781 R
See application file for complete search history.

(56) References Cited

U.S. PATENT DOCUMENTS

| | | | | |
|---|---|---|---|---|
| 10,290,930 | B2 | 5/2019 | Blackadder et al. | |
| 2002/0105471 | A1* | 8/2002 | Kojima | H01Q 3/446 343/754 |
| 2012/0063522 | A1 | 3/2012 | Fuss et al. | |

OTHER PUBLICATIONS

International Search report from corresponding PCT application No. PCT/IB2020/052330, dated Jul. 3, 2020.

* cited by examiner

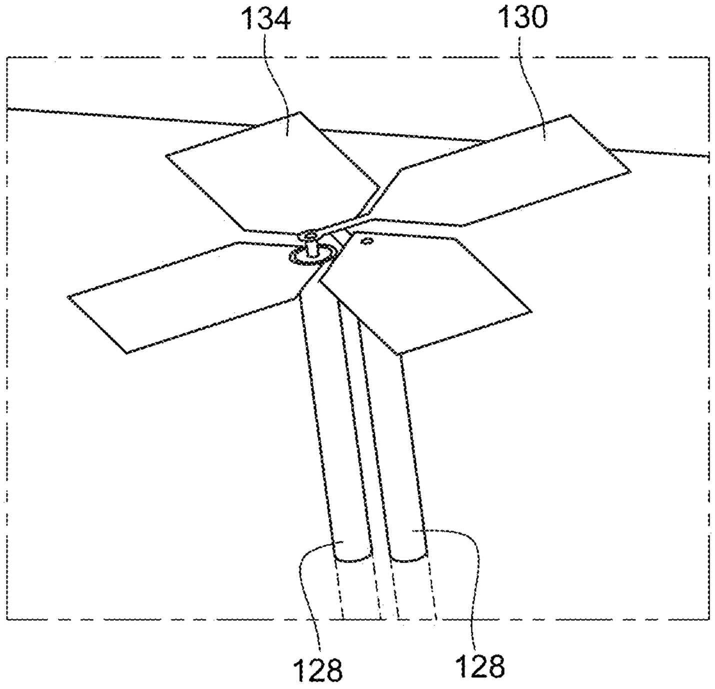
Fig. 4
PRIOR ART
Fig. 5
PRIOR ART
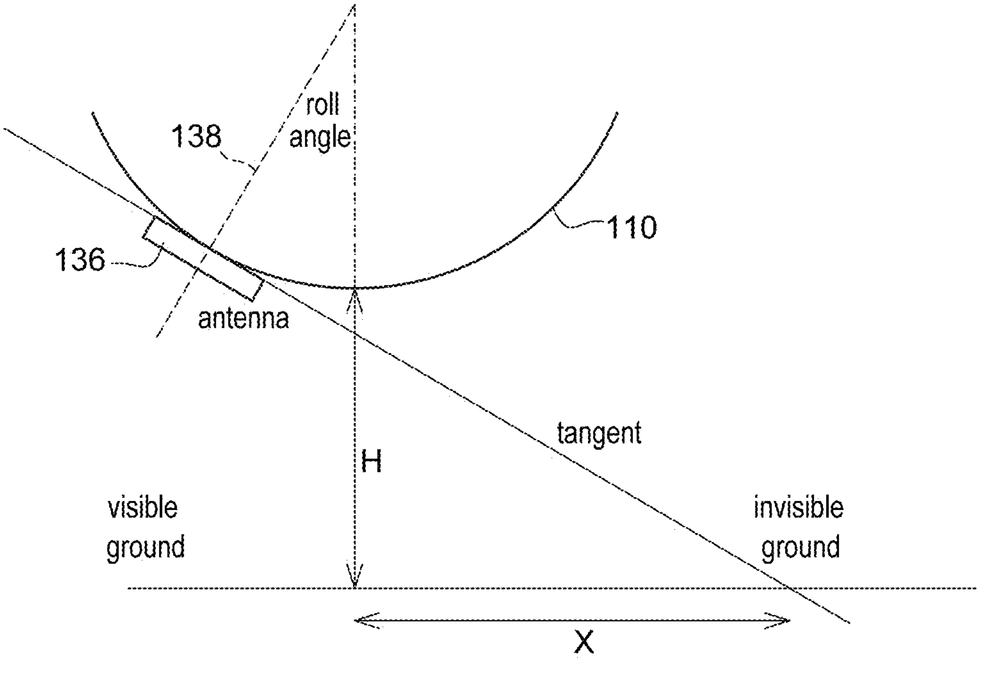

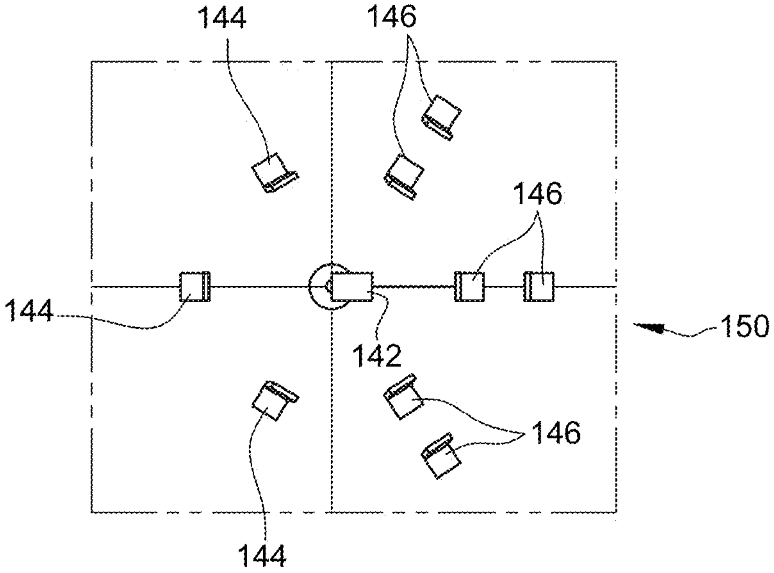
Fig. 12
Fig. 13
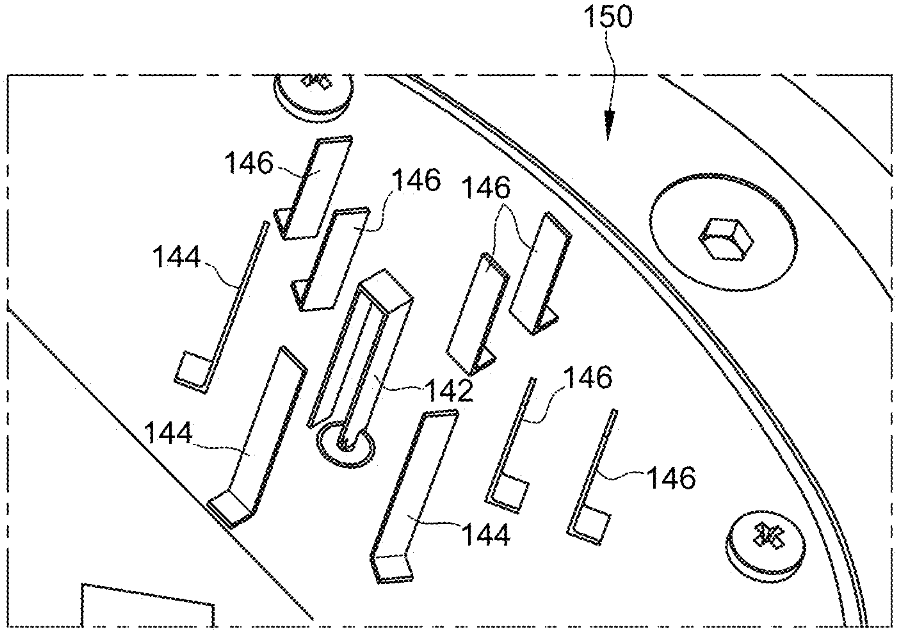

DIRECT AIR-TO-GROUND ANTENNA SYSTEMS FOR AIRCRAFT

CROSS-REFERENCES TO RELATED APPLICATIONS

This application is a U.S. National Phase under 35 U.S.C. § 371 of International Application No. PCT/M2020/052330, filed Mar. 13, 2020, which claims the benefit of U.S. Provisional Patent Application Ser. No. 62/818,973 filed on Mar. 15, 2019, the entire disclosures of which are incorporated herein by way of reference.

FIELD OF THE INVENTION

The invention relates to antennas and antenna systems for vehicles, such as aircraft, and more particularly, to direct air-to-ground antennas and antenna systems.

BACKGROUND OF THE INVENTION

Commercial aircraft utilize antenna systems as a part of a communications system, such as a direct air to ground (DA2G), which provides data transmission for a communications network with a transmission rate of up to 100 Mbps, a latency of 40 ms, typical throughput of 30 Mbps, peak throughput of 75 Mbps.

Often it is required to communicate between a radio transmitter and receiver over a large range of angles especially when one or both ends of the link are moving, such as a ground user communicating with a satellite. Additionally, the antenna(s) need to be integrated into the product, vehicle or aircraft for example, and because of the close proximity of conductive metals, the radiation pattern and hence directivity of the antenna are affected.

It is desirable in a radio system to have antennas with sufficient directivity to maximize system performance, reduce power consumption and to provide users with a high quality of service. An antenna's maximum directivity is directly proportional to its aperture and thus an antenna with a small aperture in a particular direction results in one with a low directivity in that direction.

Thus, there is a dichotomy, it is desirable to have a flat low-profile antenna for low drag, but it is also desirable to have a large aperture for high directivity.

In the general case, antennas have to be integrated into products such as a mobile phone. In the specific case of an aircraft antenna, larger antennas that protrude beyond the skin of the aircraft have higher drag and hence increase fuel costs. It is thus preferable for an aircraft antenna to be low profile to afford low drag. A low-profile antenna having a relatively large aperture perpendicular to the plane of the antenna, will have a very small aperture in a direction along the plane of the antenna.

Also, there is a growing demand for a bidirectional air-to-ground (ATG) communications system for both commercial and military applications. Larger cells mean that fewer towers are needed, but larger cells also mean that the vertical angle from the aircraft to the cell tower may be small, requiring an antenna to have high directivity at low elevation angles. Therefore, the ATG antenna requirement necessarily needs to cover the complete hemisphere, even though, due to the laws of physics, this is not realizable.

Currently airborne passengers can achieve internet connectivity by expensive SatCom service providers and by existing ATG systems, such as those developed by Gogo in the US and the European Aviation network using older LTE (4G). The problems with these systems are the high latency in the Satcom systems (due to the altitude of the satellites) and the relatively low data-rates of existing air-to-ground systems.

There is a strong market need for a suitable communications system so that airline passengers can enjoy high data-rate connectivity while in the air. An analysis of passenger data requirements now and in the near future has estimated that a commercial passenger jet aircraft, such as an A320, with some passengers streaming video, required a data transmission speed of 1 Gbps to the aircraft in order to provide a good user-experience, similar to that of an at-home experience on the ground.

The ATG flight geometry establishes the range (typically 30 km) and angle limits (5° to 90°) for known cellular data systems, particularly when aircraft 100 are flying in a range of 10,000 ft to 40,000 ft. See FIG. 1.

The performance of any antenna on the aircraft 100 and on the ground station 102 must therefore include almost the complete hemisphere being omni-directional in the azimuth plane and covering around 170° of elevation.

Due to the relatively large cell sizes and a high density of commercial flights over certain land masses, a number of aircraft could statistically be within the same cell at the same time. In order to obtain high system data throughputs of 1 Gbps or so between the ground station and the aircraft (the downlink), a high directivity antenna will be needed on the ground station. This antenna will also need to be electrically steered. Thus, in order to communicate with multiple aircraft in the same cell at the same time, multiple beams will be required from the ground station such as the massive MIMO antennas predicted to be used in stand-alone new-radio 5G systems.

A commercial ATG system should employ existing infrastructure so as to keep deployment costs to a minimum.

Governments around the world regulate how the different bands of the frequency spectrum are used. Each country has its own legacy licenses and equipment, and although various organizations try to harmonize spectrum use, it is often not possible. In this way, many different frequency bands are being identified for future 5G use around the world, users want ever increasing data rates to stream video, for example, while mobile and therefore large portions of the totally available frequency spectrum have been and are being allocated to 5G. An ATG system which includes international flights will therefore be required to cover many of these frequency bands if it is to be useful, practical and cost effective. If one were to consider the frequency bands in China (a country with high population and an immediate requirement for ATG) and Europe, for example, the ATG system would need to cover about 3.0 GHz to 5.0 GHz, ideally even more, extending below to 900 MHz. However, the wavelength in the lower frequency bands is that much longer and so antenna size is deemed too large.

An aircraft antenna needs to be low profile since if any significant profile extends beyond the skin the aircraft it is within the airflow and thus exhibits high drag. This significantly increases fuel use and therefore would add to the running costs of the ATG system. This also rules out large mechanically steered antennas which would also be less reliable and not be able to 'look' in more than one direction at once.

An antenna architecture becoming more prevalent, at least in SatCom markets, is the flat-panel electrically steered array. However, although this antenna architecture performs well when scanned at angles near to boresight, when the beam is scanned with a high scan angle towards the plane of the antenna panel, the directivity significantly reduces and the level of unwanted sidelobes increases; this behavior is contrary to what is needed for ATG applications.

Additionally, the aircraft 100 when flying at altitudes above 10,000 feet, will be within range of more than one ground station 102. It would be advantageous if the aircraft antenna could simultaneously point to more than one direction. For a single antenna array such as this, scanning multiple beams results in a reduction of directivity. In other words, consider an 8×8 element square array, if this were configured in such a way to support two simultaneous beams, then effectively the array would need to be split into two 4×8 sub-arrays and each sub-array would therefore have 3 dB less directivity. For these reasons a flat panel array is not an ideal choice for the airborne antenna in an ATG application.

A typical ATG ground station antenna is a flat panel, beam steering array 104. These antennas have many elements, have high directivity and can steer multiple beams simultaneously. Each element comprises two dipoles arranged orthogonally (usually at −45° and +45° polarization), this is called polarization diversity.

In traditional beam forming, such as when using a 2×2 array of dipole antennas, while it is possible to adjust the phases of the signals to steer a beam, there are issues with side-lobes and such an arrangement worsens interference problems. Further, with such an arrangement, it is not possible to get a good low-angle performance, such as at low aircraft altitudes, because of the scan loss.

As shown in FIG. 2, the Yagi-Uda antenna 120 (or simply Yagi antenna) is known which does not utilize a groundplane, and typically comprises a folded dipole element 124 (with an impedance of about 300Ω), a reflector 122 behind the folded dipole element, and a number of directors 126 located in front of the folded dipole element.

It is known in the art that a standard dipole antenna in space is omnidirectional in one plane and has nulls in a second plane. By placing the dipole antenna elements 134 over a groundplane 135 as shown in FIG. 3, the radiation is directed away from the plane and usually the dipole element is placed ¼ wavelength away from the groundplane.

Placing the dipole element 134 ¼ wavelength away from the groundplane 135 maximizes the gain perpendicular to the groundplane and allows a balun to be implemented to convert single-ended 50Ω feed to differential feed for the dipole. The feed to the antenna is simpler with only one vertical coaxial element 128 for the dipole elements. The dipole elements 134 should be positioned at different heights on the vertical element 128, which allows the dipole elements to be printed onto a printed circuit board. The elements are wide (in a plane horizontal to the groundplane) to widen the bandwidth. See FIG. 3.

It is also known to place another dipole pair 130 orthogonal to the first pair 134. This arrangement achieves two orthogonal polarizations. See FIG. 4. If the two pairs of dipoles are fed at 90° apart, such an arrangement could achieve right-hand or left-hand circular polarizations. If the two pairs are left with two feeds, then they can be used for polarization diversity and for potentially supporting two independent spatial streams.

A typical cellular ground station antenna comprises a number of crossed-dipole elements 134 and 130. The crossed dipole elements 134 and 130 are usually orientated as shown in FIG. 4 and define two orthogonal unit polarization vectors.

In known aircraft antenna system placements, the antenna systems 136 are typically mounted on the centerline 138 of the bottom of the aircraft 100. While this placement provides for wide and symmetric coverage, there is a loss of coverage when the aircraft executes a roll maneuver, such as during a turn. In that instance, as seen in FIG. 5, when the aircraft is at a height of 10,000 feet (3 km), with a roll angle of 15°, the effective cell radius is reduced to 11 km because part of the cell is obscured by the fuselage. With a cell diameter of 30 km, which is desired to reduce the capital expenditure necessary to achieve full cell coverage, there can be a loss of transmission coverage during such roll maneuvers.

For a high data throughput communications system, for example a 5G ATG system operating with a downlink capacity of about 1 Gbps, customers will demand a high quality-of-service which means that at all times it must be assured that the high data throughput with no significant drop-outs even when an aircraft or moving platform performs a maneuver. A moving platform in roll, pitch and yaw may introduce polarization losses as the antenna on the ground is fixed and any misalignment of the direction of the E-fields results in polarization loss. It is possible for high directivity beams to track a moving aircraft to maintain the amplitude of an EM wave, but current base-station technology does not dynamically change polarization. It is possible to use circular polarization (either left or right-hand) to minimize the polarization loss due to movement but this would remove the advantage of using two orthogonal polarizations which provide polarization diversity and hence increased data throughput.

PIN diodes are devices manufactured using p-type semiconductor (P), undoped intrinsic (I) and n-type semiconductor (N) material. They can be biased with current such that they can be switched very fast between low and high impedance states and are often used as radio frequency switches.

SUMMARY OF THE INVENTION

With an antenna on a moving platform that moves usually in a horizontal plane, flying at a cruising height or driving along a track or road, the antenna will have predominantly horizontal and vertical components to it. This invention provides three simultaneous orthogonal polarizations, the maximum that an antenna could provide. So that at any time, with vehicle roll, pitch and yaw movements, two of the three possible polarizations will exhibit less polarization loss.

Additionally, a high throughput communications system on a fast moving platform will be required to perform handovers from one cellular tower to another relatively quickly. For example, an aircraft travelling at 900 km/hr overflying a cellular tower will reach the edge of the cell 30 km away in 2 minutes. A moving vehicle would need to establish a communications link with the next cellular tower in the chain and exchange information. This would result in a data overhead to the system, a loss in potential user traffic.

Thus, if an aircraft is over one ground station, in two minutes time it will need to have completed a handover to another ground station. An antenna for an ATG system according to the present invention will be compatible with an efficient handover algorithm to reduce downtime and maximize quality of service.

An aircraft will be moving along a flight path but also exhibiting pitch, roll and yaw movements and thus the polarization vector of the aircraft antenna will be dynamically changing; an ATG aircraft antenna should take this into consideration.

An object of the invention is to provide an antenna system which can provide a data-rate of typically one Gbps as a downlink, a low latency of less than 50 ms, allowing a cell size for ground antennas of about 60-80 km diameter, for vehicles, and in particular for aircraft having altitudes of 10,000 ft to 40,000 ft (3 km to 12 km). The antenna system is to support multiple data streams, to support multiple polarizations, and to have a high gain over most of the hemisphere ($-85°\leq\theta\leq85°$, $0°\leq\varphi\leq360°$, where θ is a polar angle in a spherical coordinate system and φ is an azimuthal angle).

The antenna system for an aircraft, in an embodiment of the present invention, may comprise one or more antennas configured and arranged on the aircraft to provide a high downlink data throughput of typically one Gbps, permitting a base cell tower placement with a diameter of typically 60 km, being configured and arranged to support multiple data streams simultaneously, supporting multiple polarizations, and having a high gain over most of a hemisphere around the one or more antennas of $-85°\leq\theta\leq85°$, $0°\leq\varphi\leq360°$.

An embodiment of the present invention provides a modified Yagi-Uda folded dipole antenna in which the magnitude of the e-field is zero along the centerline of the Yagi. In this way, half of the typical antenna configuration is disused and instead, is replaced with a groundplane along the centerline. The typical folded dipole becomes a folded monopole (with an impedance of about 150Ω). The aircraft fuselage is used as the groundplane and thus, the antenna forms an end-fired array.

The modified Yagi antenna in an embodiment of the present invention, for an aircraft, may comprise a folded monopole extending from a fuselage of the aircraft, which fuselage is configured and arranged to act as a groundplane, a reflector positioned to one side of the folded monopole and also extending from the fuselage of the aircraft, and a set of one or more directors positioned opposite the one side of the folded monopole where the reflector is positioned, wherein the one or more directors, the folded monopole and the reflector form a linearly aligned array.

The position and the length of the elements (directors, reflector and folded monopole) of the antenna can be modified to affect the radiation pattern and the impedance. For example, the elements can be modified to achieve an impedance of 50Ω and a very high gain at $\theta=85°$ of +5.6 dBi.

The modified Yagi antenna according to an embodiment of the invention may include a second reflector positioned to one side of the folded monopole, at an angle relative to the position of the first reflector, and a second set of one or more directors is positioned opposite the one side of the folded monopole where the second reflector is positioned, wherein the second set of one or more directors, the folded monopole and the second reflector form a linearly aligned array arranged at the angle relative to the first linearly aligned array formed by the first set of directors, the folded monopole and the first reflector.

The modified Yagi antenna according to an embodiment of the invention may include a third reflector positioned to one side of the folded monopole, at an angle relative to the position of the first and the second reflectors, and a third set of one or more directors is positioned opposite the one side of the folded monopole where the third reflector is positioned, wherein the third set of one or more directors, the folded monopole and the third reflector form a linearly aligned array arranged at the angle relative to the first linearly aligned array formed by the first set of directors, the folded monopole and the first reflector and at an angle relative to the second linearly aligned array formed by the second set of directors, the folded monopole and the second reflector.

A switched beam modified Yagi-Uda array may be achieved by adding a number of additional directors/reflectors and using RF switches. The common element to this structure is the driven folded monopole. By switching in and out each set of reflectors and directors, the beam can be directed in different directions.

The advantages of using a traditional Yagi-Uda dipole antenna modified into an end fire folded monopole antenna are:

This allows the antenna to be used on a groundplane (aircraft fuselage);

The antenna can be optimized for an impedance of 50Ω;

Excellent directivity is provided, with a good back/front ratio;

A high gain is achieved at low elevation angles;

A 110° beamwidth can be obtained with two directors in that the number of directors determines the beamwidth;

Three sectors (using 3 directors) easily covers 180° azimuth with no inter-beam dropout;

Four to six sectors (4 to 6 directors) would cover a 360° azimuth.

An embodiment of the invention may use two independent arrays, one pointing forward and one pointing aft. Since these arrays have a high isolation from each other, they could support two independent data streams.

The system architecture of this invention is such that the antenna has at least two parts (the embodiment described below comprises three main parts), one part providing the user traffic and another part, completely independent from the main part, that has high directivity in the direction of movement, and is looking ahead for the next handover, negotiates the handover, thus not reducing user traffic.

In an embodiment, the present invention proposes to use a crossed dipole antenna array, such as a two-by-two array. This arrangement could include a parasitic element to improve bandwidth. The parasitic element could also be printed onto the printed circuit board.

By using a number of such crossed dipole antenna elements in an array, all of the elements of each polarization could be fed in-phase which would increase directivity of the antenna.

The antenna or antennas and antenna arrays can be selectively positioned on the aircraft to improve coverage and signal transmission to the various ground antennas.

For example, although the antennas are located on the fuselage of the aircraft, on aircraft having engines located under the wings of the aircraft, the engines, with their relatively large diameters, cause some shadowing of the signals at some angles relative to the placement of the antenna, whether near the front of the aircraft, or near the rear.

In an embodiment, the present invention provides for the use of two antenna assemblies, one forward and one aft, which then avoids the problem of shadowing since one antenna will provide an uninterrupted signal transmission in the shadow region of the other antenna assembly, and vice versa.

An antenna system according to an embodiment of the invention, for an aircraft having a longitudinal axis, may comprise a first antenna mounted on a first portion of the aircraft, and a second antenna mounted on a second portion of the aircraft that is displaced along the longitudinal axis from the first portion, wherein although various components of the aircraft may shadow transmissions in certain areas from either one of the first or second antenna, the placement of the other of the first and second antenna will provide unshadowed transmissions to those certain areas.

The antenna system may be configured such that wherein the first antenna is mounted forward of main wings of the aircraft and the second antenna is mounted rearward of the main wings.

An embodiment of the present invention places two antennas on a lower portion of the fuselage, each at an antenna install angle of, for example 15°, from the centerline of the aircraft. This will assure that as an aircraft rolls, at least one of the antenna systems will have a direct view of the ground cell antenna at all times.

The architecture for an aircraft antenna system in an embodiment of the invention may be designed to minimize losses. For example, the RF head may be positioned close to the antenna to keep coaxial cable lengths short. Long fiber optic cables may be used to link the RF heads to the main electronics which typically are housed in the electronics bay located under the cockpit. Such an arrangement may be used on a two-antenna assembly system, without incurring undesirable losses.

In an embodiment of the invention, a system architecture for antennas in an aircraft may comprise a head end server unit and various aircraft systems connected to a direct air to ground server, one or more radio frequency (RF) heads connected to the direct air to ground server via fiber optic cables, and one or more antennas connected to the one or more RF heads via coaxial cables, wherein the one or more RF heads are located close to the one or more antennas (less than one meter away) so as to minimize losses in the coaxial cables.

In an embodiment of the invention, multiple antenna systems may be provided on the aircraft so that multiple streams of data may be transmitted simultaneously via different antenna systems. Such an arrangement may be useful during hand-over from one cell to another.

By combining the various embodiments of the present invention, with the use of one crossed 2×2 array, which provides two orthogonal polarizations and supporting two spatial streams there is a gain of >10 dB. With the use, also, of two switched modified Yagi arrays, a third polarization may be obtained, each providing a 180° azimuth coverage and more than +5 dB gain at 85° elevation, and each providing one spatial stream. With this arrangement, where $\theta$ is the angle as measured along a vertical plane running in a front to rear direction of the vehicle, such as an aircraft, and where $\varphi$ is the angle as measured around the vertical axis of the antenna, there is achieved a >5 dB gain over $-85° \leq \theta \leq 85°$, $0° \leq \varphi \leq 360°$, thus making a high data throughput of typically 1 Gbps 5G air to ground system possible.

In an embodiment of the present invention, an antenna system for an aircraft having a longitudinal axis and a vertical center plane is provided comprising a first antenna mounted on a first lower portion of a fuselage of the aircraft positioned to one side of the vertical center plane, and a second antenna mounted on a second lower portion of the aircraft fuselage that is displaced to an opposite side of the vertical center plane from the first portion.

In an embodiment, the first antenna may be mounted at an angle of 15° from the vertical center plane of the aircraft and the second antenna may be mounted at an angle of 15° on the other side of the vertical center plane of the aircraft.

In an embodiment of the invention, an antenna system for an aircraft having a fuselage is provided comprising one crossed dipole 2×2 array of antennas mounted to the fuselage of the aircraft, configured and arranged to provide two orthogonal polarizations and supporting two spatial data streams, with a gain of at least +10 dB, two switched Yagi antenna arrays mounted to the fuselage of the aircraft, configured and arranged to provide a third polarization, and with each Yagi antenna array providing 180° azimuth coverage, with more than a +5 dB gain at an 85° elevation, and with each Yagi antenna array providing one data stream.

The antenna system of this embodiment has three orthogonal polarizations which helps with multiple streams to increase data throughput.

The antenna system of this embodiment has combined several different antennas with different radiation patterns which will insure both high gain at low angles needed for direct air to ground and when flying over the cell tower, in that flight paths are not fixed, however, the cell tower locations are.

The antenna system of this embodiment further implements a folded monopole with several switched directors and reflectors which provides a low-cost solution to achieving a directed beam it is more power efficient and requires less weight.

Multiple antenna assemblies are mounted on the aircraft to avoid aircraft roll shading and engine shading.

Multiple antennas within each assembly are able to communicate independently with several cell towers which increases data throughput and helps with cellular handovers.

The use of an end-fire ½ Yagi folded monopole antenna allows the antenna system to overcome low-angle gain problems.

Further, the antenna system of the present invention is small, easy to install and presents very low drag and has a low weight.

The aspects described above and further aspects, features and advantages of the invention can likewise be taken from the examples of the embodiment, which is described below with reference to the accompanying drawings.

BRIEF DESCRIPTION OF THE DRAWINGS

In the figures, the same reference signs are used for elements, components or aspects that are the same or at least similar. It is noted that there follows a detailed description of an embodiment that is merely illustrative and not restrictive. In the claims, the word "comprising" or "having" does not exclude other elements and the indefinite article "a" or "an" does not exclude more than one. The fact alone that certain features are mentioned in various dependent claims does not restrict the subject matter of the invention. Combinations of these features can also be advantageously used. The figures are not to be understood as true to scale but are only of a schematic and illustrative character. In the figures FIG. 4 shows a prior art crossed dipole over ground, FIG. 5 shows a prior art placement of aircraft antennas on an aircraft, FIG. 12 shows a switched beam modified Yagi-Uda antenna of the present invention in a plan view, FIG. 13 shows a switched beam modified Yagi-Uda antenna of the present invention in a perspective view.

DETAILED DESCRIPTION OF THE PREFERRED EMBODIMENTS

Although the present invention can be used in a wide variety of vehicles and other moving apparatus, an embodiment of the invention is disclosed in the context of an antenna system for use in an aircraft. In such an embodiment, the present invention covers an antenna design with sufficient bandwidth to support 5G bands, has one omnidirectional radiation pattern, beam selectable patterns and has three orthogonal polarizations to support several spatial streams. A main strength of the antenna design is that it has high directivity at low elevation angles which is necessary for a high-throughput air-to-ground radio link. Furthermore, the antenna is largely passive containing only PIN diode semiconductor devices and no amplifier and phase changers that you would find in an active phased array, thus in an extreme environment, such as that outside an aircraft flying at high altitude, it is extremely reliable. Reliability is very important in aeronautics as the time taken to find and make repairs to aircraft systems relates directly to lost profits.

An object of the invention is to provide an antenna system which can provide a high data throughput typically one Gbps as a downlink, allowing a cell size for ground antennas of a nominally 60-80 km diameter, with aircraft altitudes of 10,000 ft to 40,000 ft (3 km to 12 km). The antenna system is to support multiple data streams, to support multiple polarizations, and to have a high gain over most of the hemisphere ($-85°\leq\theta\leq 85°$, $0°\leq\varphi\leq 360°$, where $\theta$ is a polar angle in a spherical coordinate system and $\varphi$ is an azimuthal angle).

Figure 1:
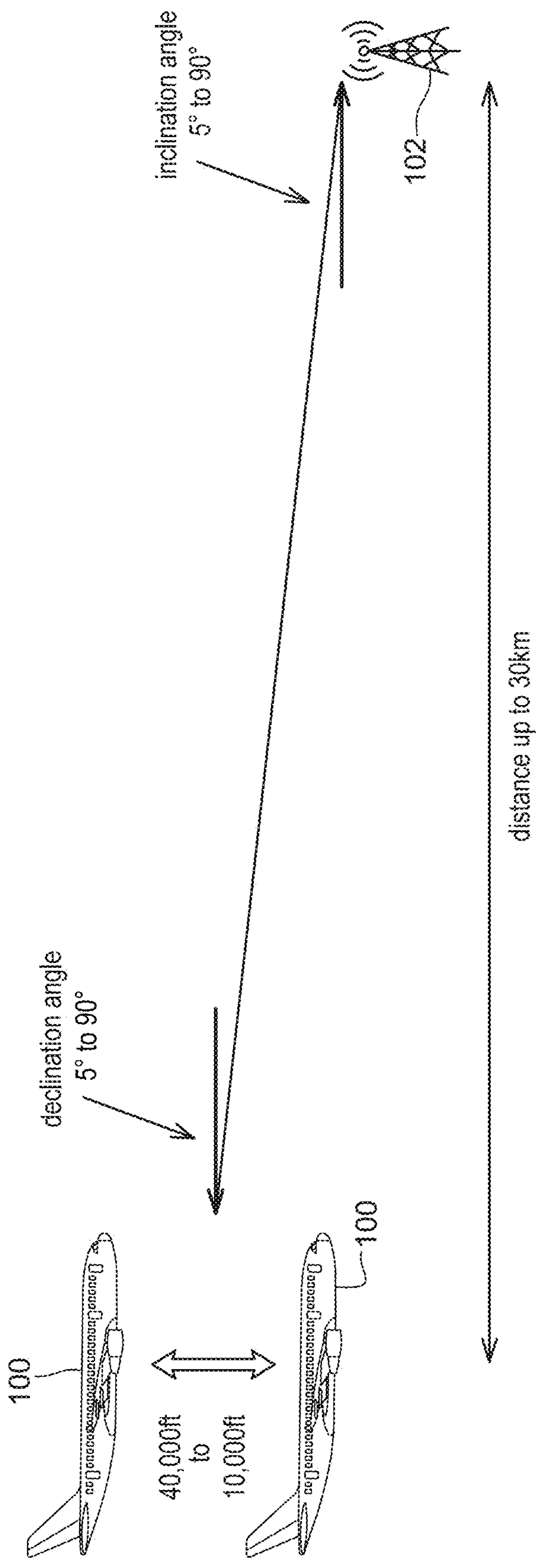
Fig. 1 PRIOR ART
FIG. 1 shows a prior art DA2G flight geometry.
Figure 2:
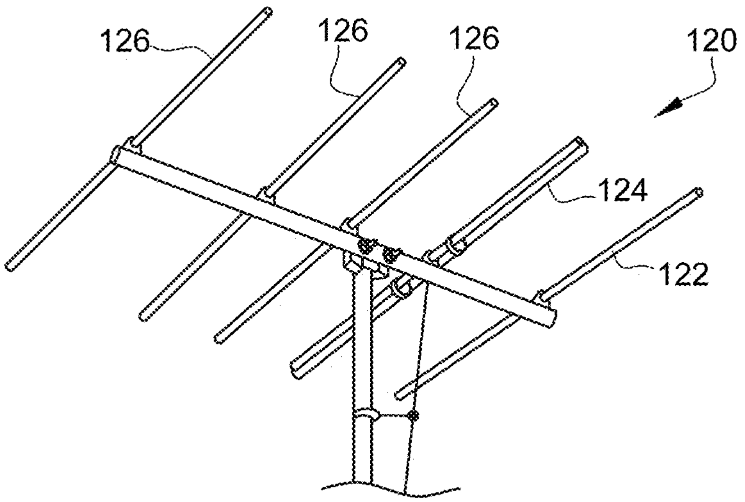
Fig. 2 PRIOR ART
FIG. 2 shows a prior art Yagi-Uda Antenna.
Figure 3:
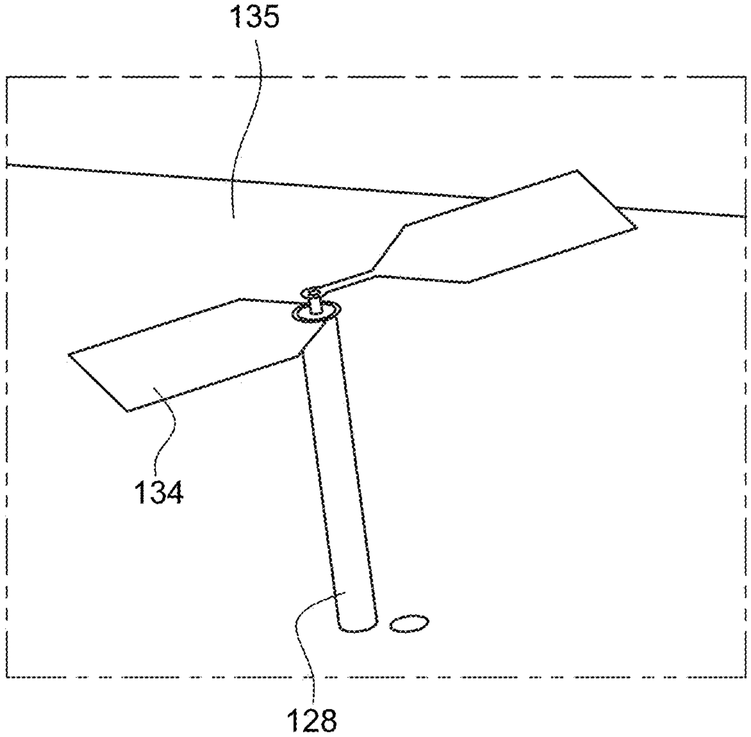
Fig. 3 PRIOR ART
FIG. 3 shows a prior art simple dipole over ground.
Figure 6:
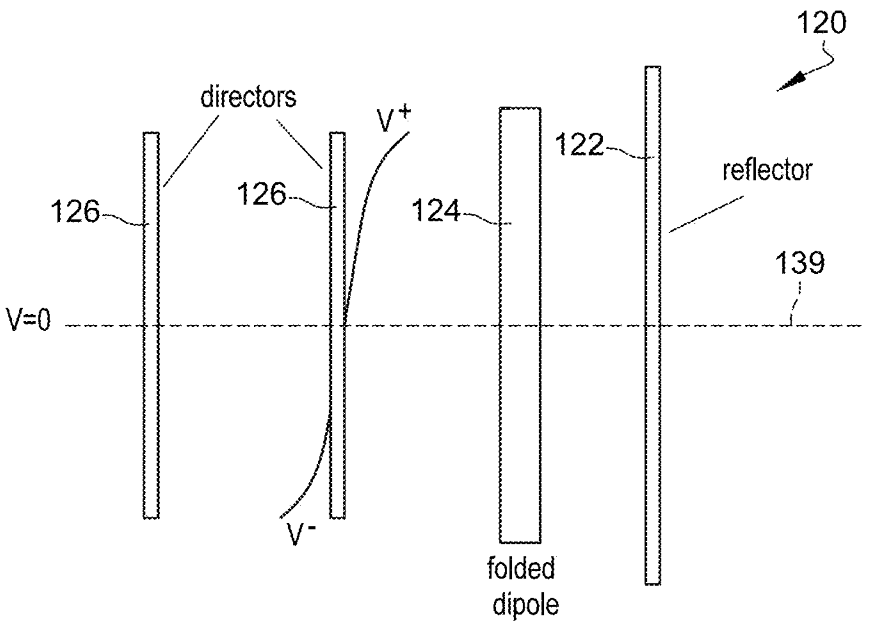
Fig. 6 PRIOR ART
FIG. 6 shows a typical prior art Yagi-Uda antenna.
Figure 7:
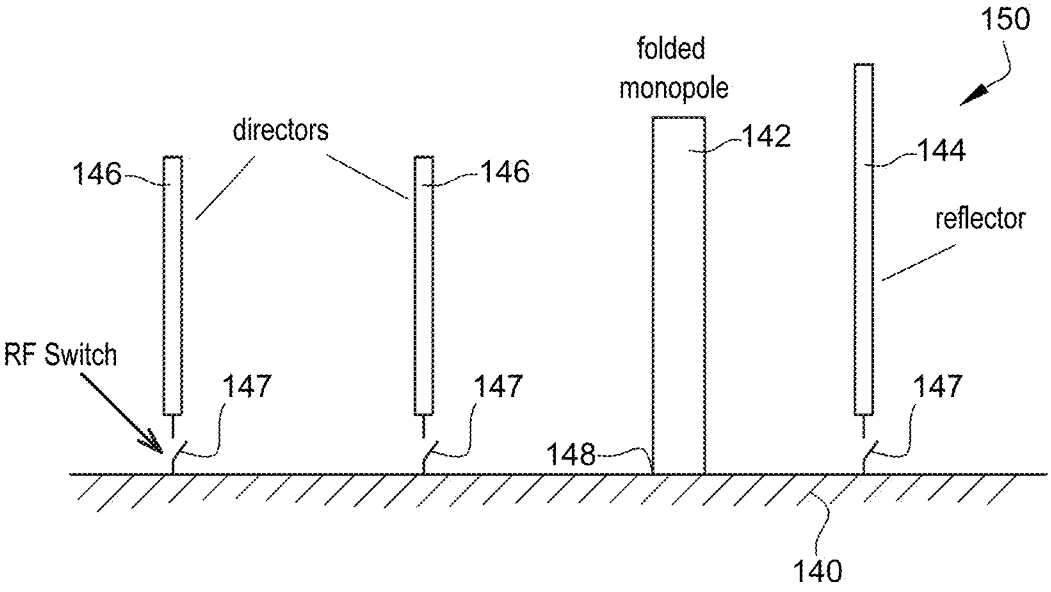
FIG. 7 shows schematically a modified Yagi-Uda antenna of the present invention.
Figure 8:
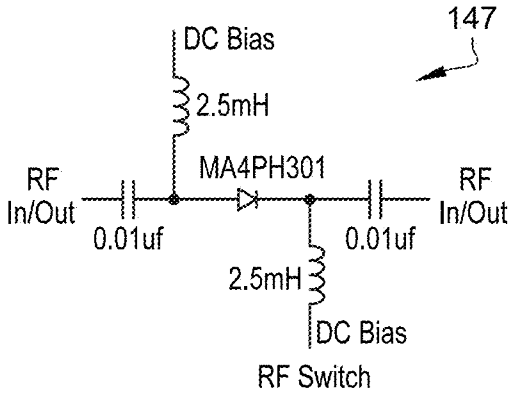
FIG. 8 shows an embodiment of an RF switch usable in the present invention.

An embodiment of the present invention provides a modified Yagi-Uda antenna in which the magnitude of the e-field is zero along the centerline. A typical prior art Yagi-Uda antenna 120 is shown in FIG. 6, it comprises a half wavelength folded dipole. Along the dotted centerline 139, the E-field voltage is always zero (this is why in a practical antenna, the elements 122, 124, 126, can be galvanically connected to a metal boom for mechanical rigidity without disrupting the performance). For the present invention, half of the typical antenna configuration is disused, as shown in FIG. 7, and instead, is replaced with a conductive groundplane 140 along the centerline. The typical folded dipole is thus converted into a folded monopole 142 (with an impedance of about 150Ω). The aircraft fuselage is used as the groundplane 140 and thus, the antenna forms an end-fired array. See FIG. 7. The length of the driven folded monopole 142 being a quarter wavelength, the reflector 144 is slightly longer, and the directors 146 are slightly shorter. The directors and reflector can be connected to ground via RF switches 147, such as that shown in FIG. 8.

As with the Yagi-Uda antenna, either a monopole (impedance 37Ω) or folded-monopole (impedance 146Ω) configuration could be used. A folded-monopole configuration is shown in FIG. 7 where the far-end 148 of the fed element is galvanically connected to the groundplane 140. The reflector 144 and two directors 146 are also connected to ground (via the RF switches 147).

Figure 10:
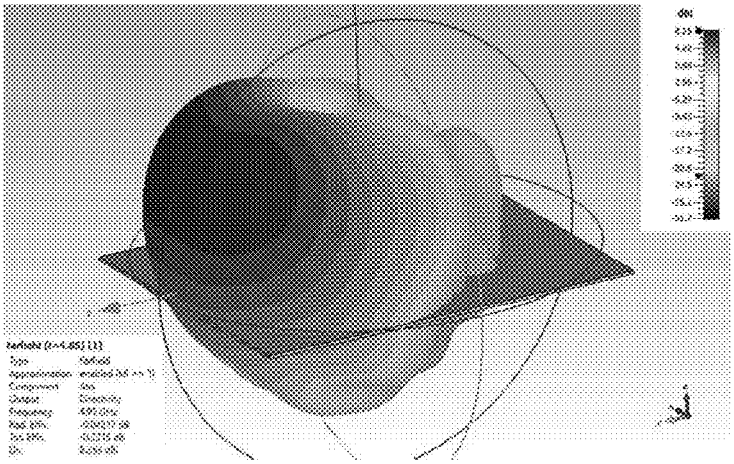
FIG. 10 shows the radiation pattern performance of the modified Yagi-Uda antenna of the present invention in a perspective view.
Figure 11:
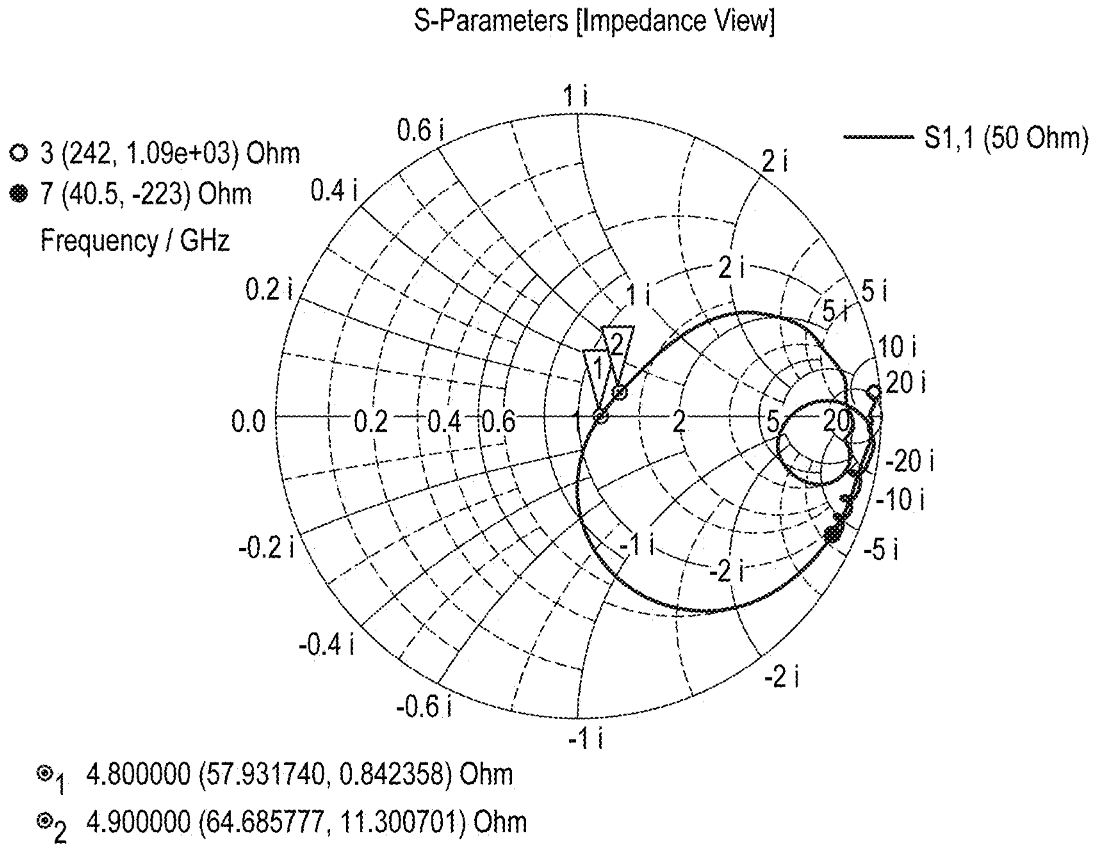
FIG. 11 shows the complex impedance performance of the modified Yagi-Uda antenna of the present invention on a Smith Chart.

The position and the length of the elements (directors 146, reflector 144 and folded monopole 142) of the antenna 150 can be modified to affect the radiation pattern and the impedance. If the desired impedance were to be 50Ω (typically found in commercial radio applications as coaxial cables and test equipment are readily available with this characteristic impedance), a folded-monopole embodiment would be preferred. The reason being that the lengths and positions of the reflector and directors can be carefully chosen to provide reasonable fractional bandwidth (approaching 10%) and impedance close to 50Ω. For example, the elements can be modified to achieve an impedance of 50Ω and a very high gain at $\theta=85°$ of +5.6 dBi. See FIGS. 9, 10 and 11. FIG. 11 shows the impedance successfully optimized to 50Ω, and in FIG. 10, the 3D radiation pattern being essentially broad beamwidth in azimuth, a null perpendicular to the groundplane (as with all monopoles and dipoles) and essentially, high directivity along the axis of the array especially at low angles of elevation. This embodiment shows a maximum directivity of over 8 dB. This type of antenna is often referred to as an end-fire antenna.

Figure 9:
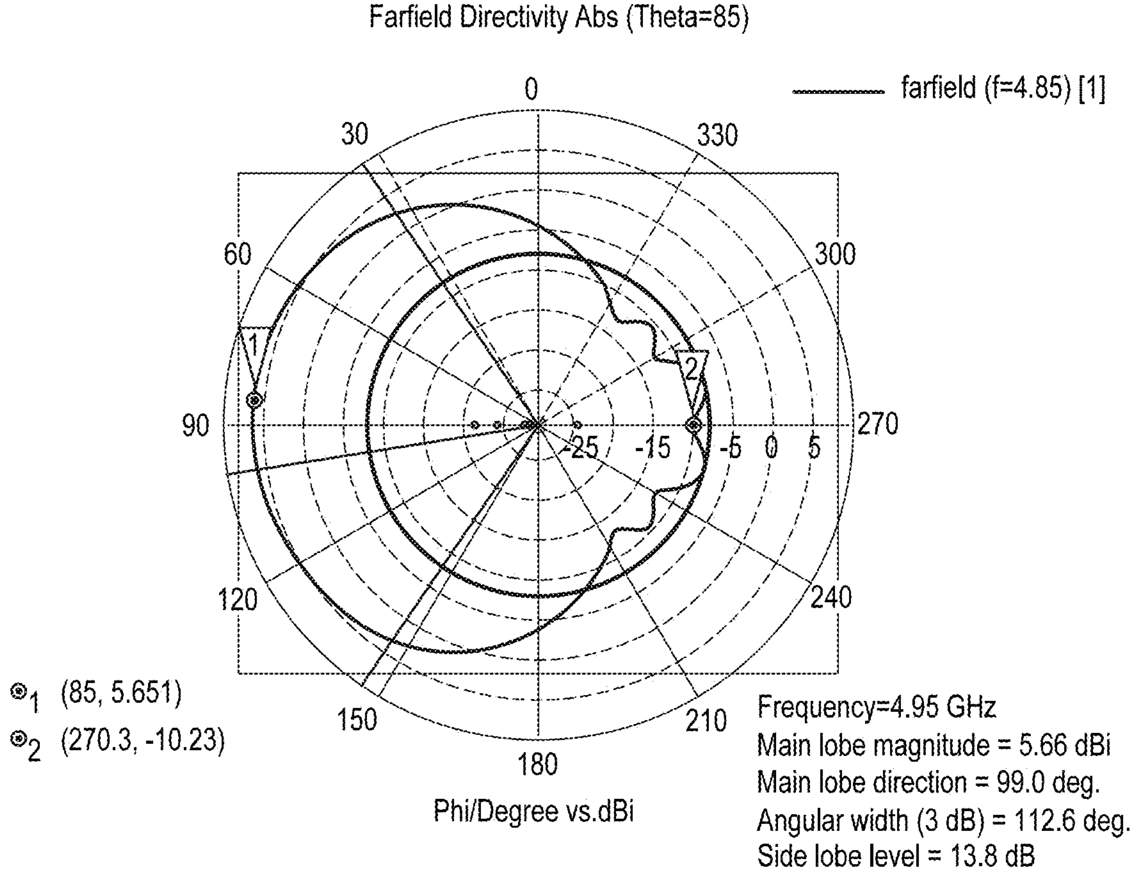
FIG. 9 shows the radiation pattern performance of the modified Yagi-Uda antenna of the present invention in one plane.

In FIG. 9, it is shown that at an elevation of only 5°, the antenna has a directivity of over +5 dB.

A switched beam modified Yagi-Uda array may be achieved by adding a number of additional directors/reflectors and using RF switches to enable/disable the appropriate directors and reflectors. The folded monopole being common to all beams, the switches only switch in and out the parasitic elements.

In FIG. 12, the sets of directors 146 and reflectors 144 are mounted at angles with respect to each other while sharing the same driven element 142. In FIG. 12, there are three sets of elements, the driven element 142 in the center, three different reflectors 144 below, and three sets of two directors 146 above. This arrangement is shown in a perspective view in FIG. 13.

In summary, there can be provided three separate 4-element (in this embodiment) antennas 150 which share a common driven element 142. The idea is that RF switches 147 can be used, preferably PIN diode semiconductor high-speed switches, to select one of these antennas in turn and disable the others.

Figure 14:
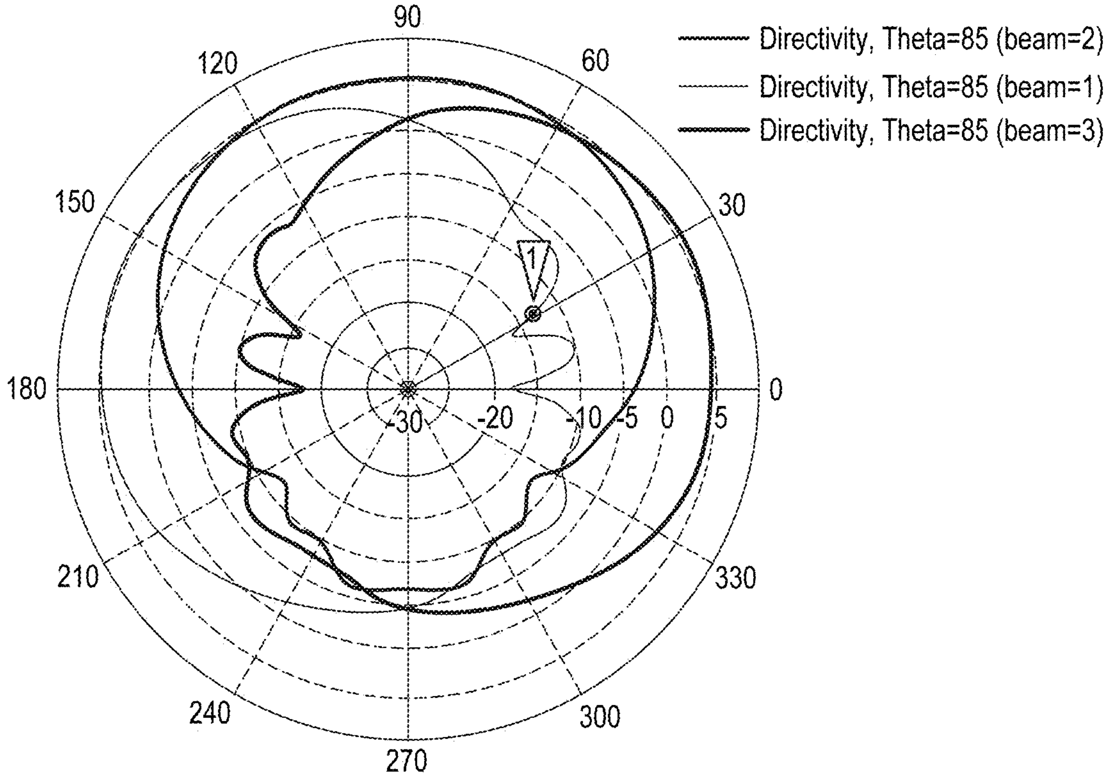
FIG. 14 shows the selectable directivity of the beam of the modified Yagi-Uda antenna of the present invention in one plane.

By placing a PIN diode switch (or other suitable device) 147 between all of the parasitic elements and ground, and applying suitable bias currents to the PIN diodes, a desired direction of the beam can be achieved. FIG. 14 shows 2D directivity patterns of an embodiment with three beams at 60 degree offsets. This shows that it is possible to select the angle of maximum directivity of the antenna in 60° increments.

The RF signal is always applied to the folded monopole 142. The RF switches 147 are used to either connect the directors 146 and reflector 144 to the groundplane 140, or leave them open circuit. So, the switches are used to direct the beam, not route the signal. In this way, the beam can be directed in different directions. See FIG. 14.

The advantages of using a traditional Yagi-Uda dipole antenna modified into an end fire folded monopole antenna are:

This allows the antenna to be used on a groundplane 140 (aircraft fuselage);

The antenna can be optimized for an impedance of 50Ω;

Excellent directivity is provided, with a good back/front ratio;

A high gain is achieved at low elevation angles;

A 110° beamwidth can be obtained with two directors 146 in that the number of directors determines the beamwidth;

Three sectors (using three directors 146) easily covers 180° azimuth with no inter-beam dropout;

Four to six sectors (four to six directors 146) would cover a 360° azimuth.

This antenna architecture provides a switched beam with high directivity at low elevation angles at very low cost as it employs simple PIN diode semiconductors. It provides far superior directivity than a flat-panel phased-array at low levels of elevation. This antenna architecture also has many use-cases including an airborne antenna for an air-to-ground communications system where high directivity is necessary to achieve the required signal-to noise ratio for distance ground terminals which subtend very low angles of elevation. An antenna with a higher directivity will generally require less transmit power (hence better DC efficiency) to achieve the same radiated power, or for the same transmit power, will result in higher signal to noise ratios thus increasing the data throughput of a digital communications system.

Figure 15:
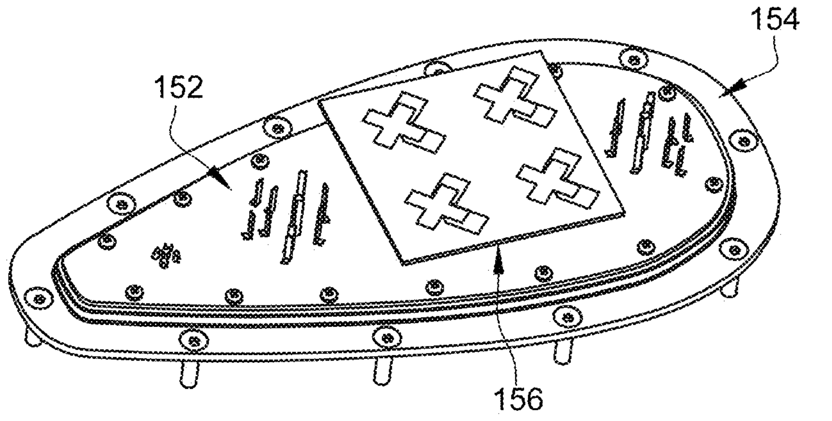
FIG. 15 shows an embodiment of two arrays of the modified Yagi-Uda antenna and a 2×2 crossed dipole array in an antenna system of the present invention.

An embodiment of the invention may use two independent arrays 152, 154, one pointing forward and one pointing aft. Since these arrays have a high isolation from each other, they could support two independent data streams. See FIG. 15.

Figure 16:
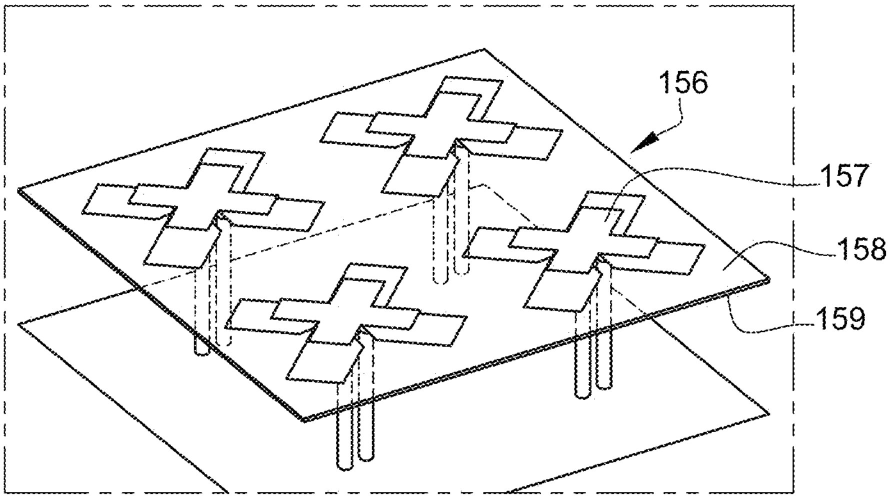
FIG. 16 shows a crossed dipole antenna array of the present invention.

In an embodiment, the present invention proposes to use a crossed dipole antenna array 156, such as a two-by-two array. See FIG. 16. This arrangement could include a parasitic element 157 to improve bandwidth. Between the dipole and the parasitic element 157, there is a space which could be filled with air. The parasitic element 157 could also be printed onto a printed circuit board 158 and foam 159 could be provided in the circuit board.

By using a number of such crossed dipole antenna elements in an array, all of the elements of each polarization could be fed in-phase which would increase directivity of the antenna.

The antenna or antennas and antenna arrays can be selectively positioned on the aircraft to improve coverage and signal transmission to the various ground antenna.

Figure 17:
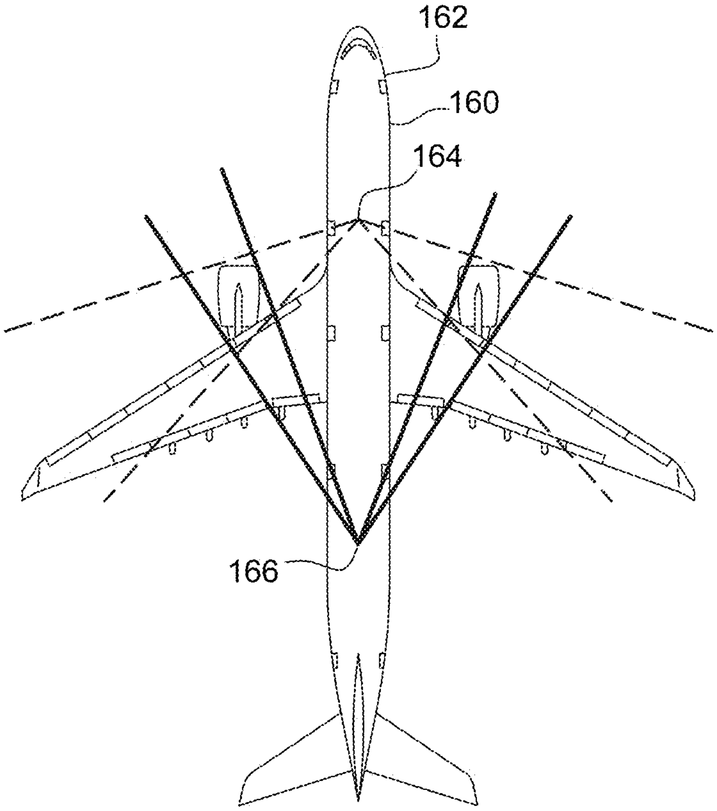
FIG. 17 shows a choice of antenna location in accordance with the present invention.

For example, although the antennas are located on the fuselage 160 of the aircraft 162, on aircraft having engines located under the wings of the aircraft, the engines, with their relatively large diameters, cause some shadowing of the signals at some angles relative to the placement of the antenna, whether near the front of the aircraft, or near the rear. See FIG. 17.

In an embodiment, the present invention provides for the use of two antenna assemblies, one forward 164 and one aft 166, which then avoids the problem of shadowing since one antenna will provide an uninterrupted signal transmission in the shadow region of the other antenna assembly, and vice versa.

Figure 18:
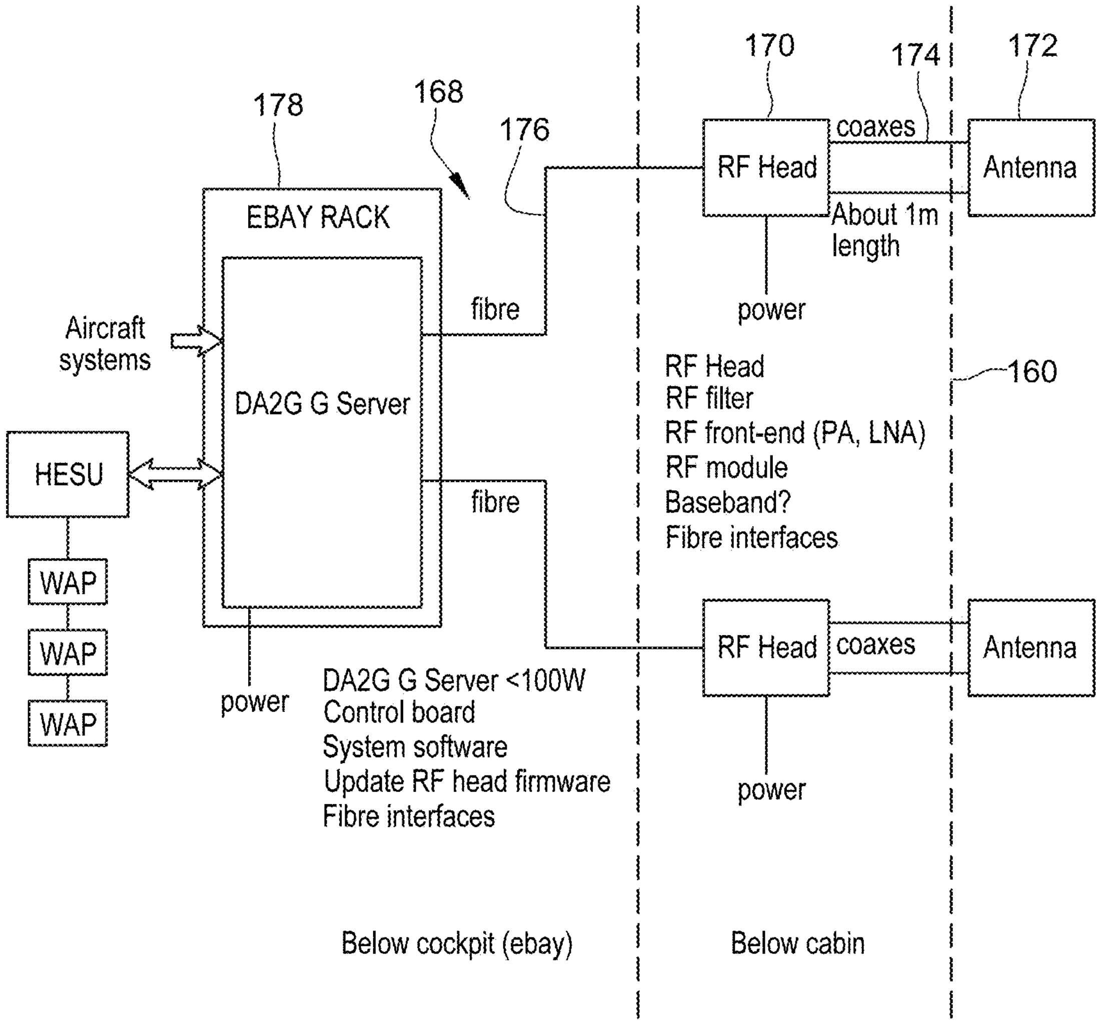
FIG. 18 shows a schematic system architecture for the present invention.

As shown in FIG. 18, the architecture for the aircraft antenna system 168 may be designed to minimize losses. For example, the RF head 170 may be positioned close to the antenna 172 to keep coaxial cable lengths 174 short. Long fiber optic cables 176 may be used to link the RF heads 170 to the main electronics 178 which typically are housed in the electronics bay located under the cockpit. Such an arrangement may be used on a two-antenna assembly system, without incurring undesirable losses.

As mentioned previously, in known aircraft antenna system placements, the antenna systems are typically mounted on the centerline of the bottom of the aircraft. While this placement provides for wide and symmetric coverage, there is a loss of coverage when the aircraft executes a roll maneuver, such as during a turn. In that instance, as seen in FIG. 5, when the aircraft is at a height of 10,000 feet (3 km), with a roll angle of 15°, the effective cell radius is reduced to 11 km because part of the cell is obscured by the fuselage. With a cell diameter of 30 km, which is desired to reduce the capital expenditure necessary to achieve full cell coverage, there can be a loss of transmission coverage during such roll maneuvers.

Figure 19:
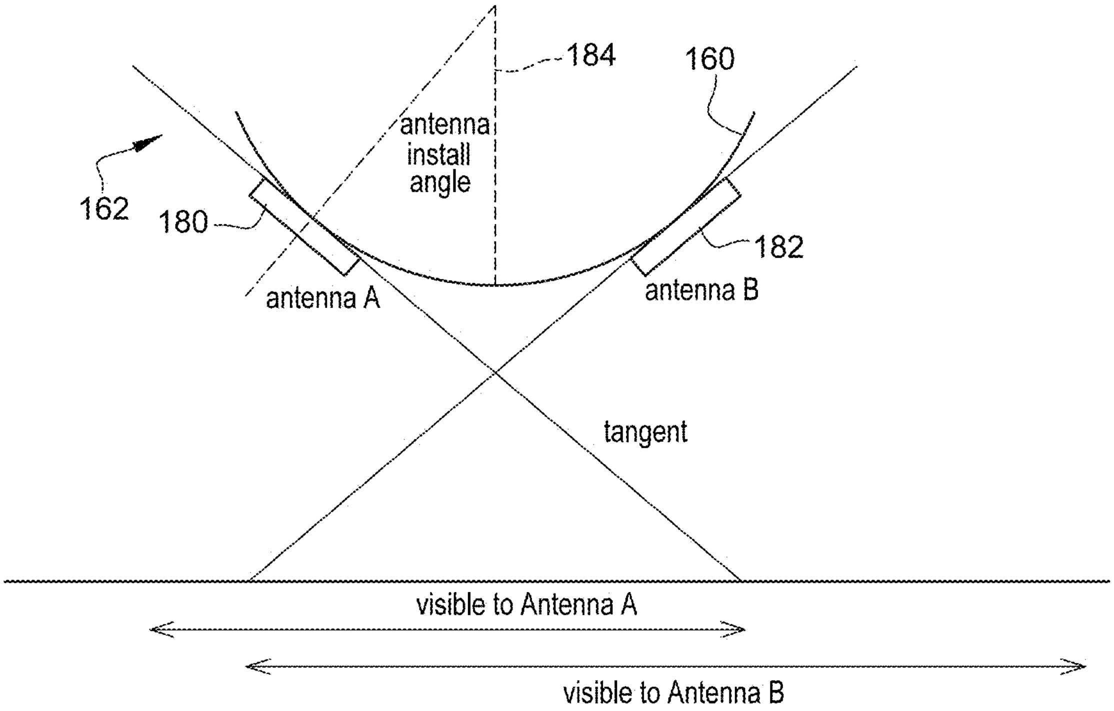
FIG. 19 shows a choice of antenna location in accordance with the present invention.

A solution to this problem is provided by an embodiment of the present invention by placing two antennas 180, 182 on the fuselage 160, each at an antenna install angle of, for example, 15° from the centerline 184 of the aircraft 162. See FIG. 19. This will assure that as an aircraft rolls, at least one of the antenna systems will have a direct view of the ground cell antenna at all times. The antenna install angle may be varied by +/−10°.

Figure 20:
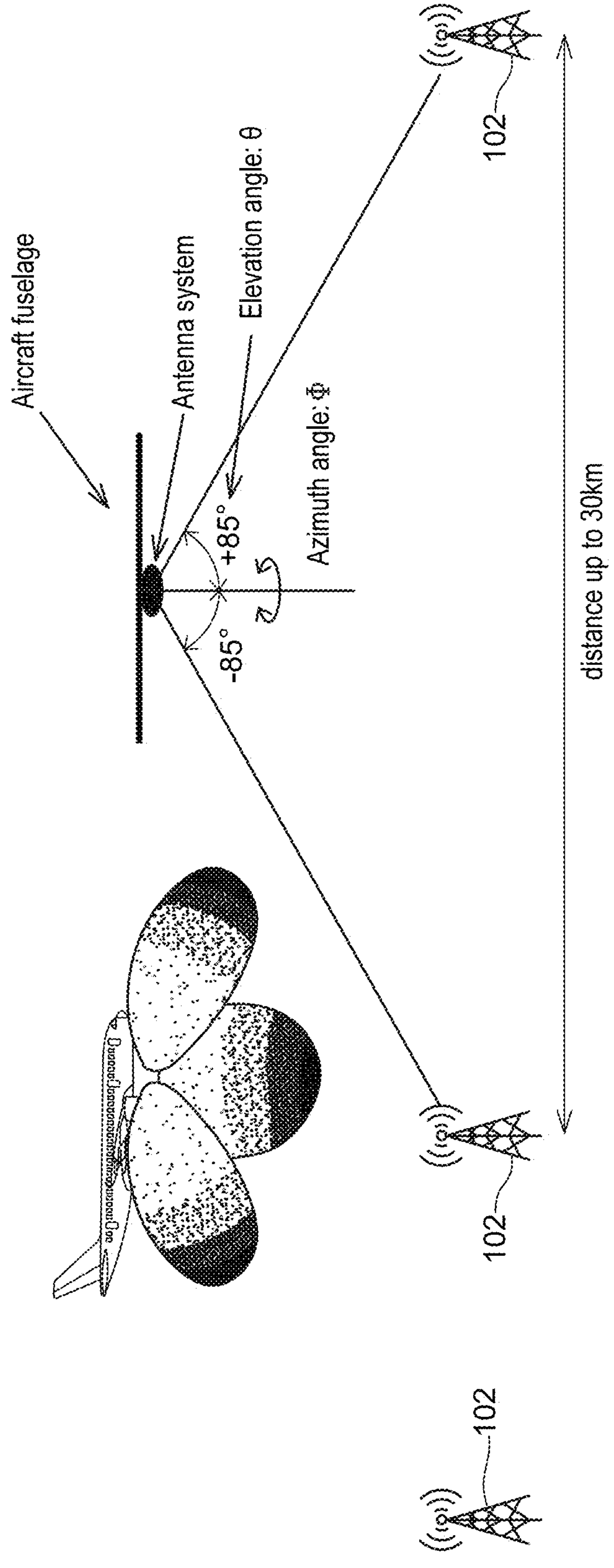
FIG. 20 shows schematically how each array supports multiple base-stations.

With multiple antenna systems on the aircraft, multiple streams of data may be transmitted simultaneously via different antenna systems. Such an arrangement may be useful during hand-over from one cell tower 102 to another. See FIG. 20.

Figure 21:
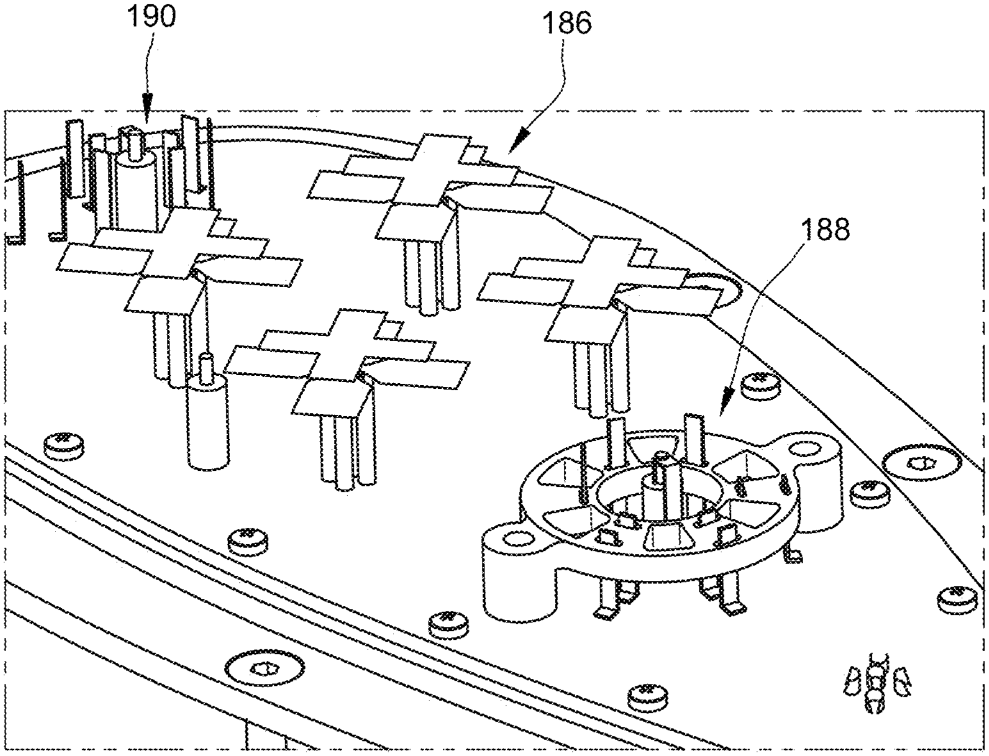
FIG. 21 illustrates a combination of antennas into an antenna system of the present invention.

As shown in FIG. 21, by combining the various concepts of the present invention, with the use of one crossed 2×2 array 186, which provides two orthogonal polarizations and supporting two spatial streams there is a gain of >10 dB. With the use, also, of two switched modified Yagi arrays 188, 190, a third orthogonal polarization may be obtained, each providing a 180° azimuth coverage and more than +5 dB gain at 5° elevation, and each providing one spatial stream. With this arrangement there is achieved a >5 dB gain over $-85°\leq\theta\leq85°$, $0°\leq\varphi\leq360°$, thus making a high data throughput system of typically one Gbps 5G air to ground system possible.

Figure 22:
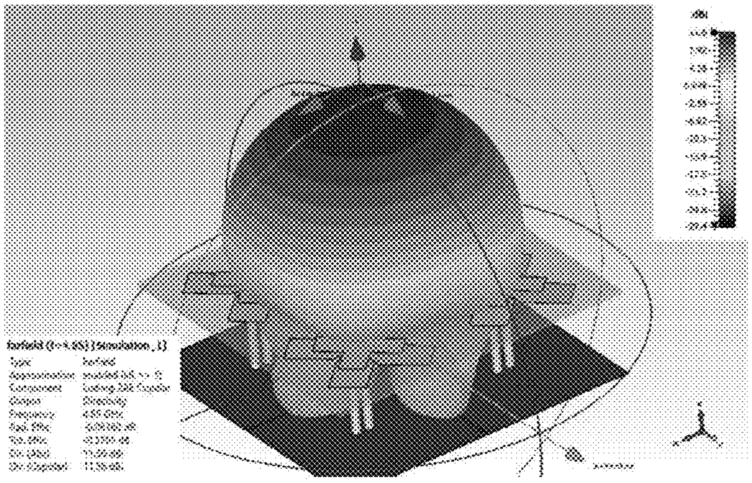
FIG. 22 shows an example 3D radiation pattern from the 2×2 crossed dipole array of the antenna system of the present invention.

In the center of the antenna system is a horizontally polarized section 186 comprising at least one pair of cross-dipoles, the more crossed dipole sections, if fed in-phase, results in more directivity. For example, a 2×2 array of crossed dipoles will provide about 12 dB of directivity, an example 3D radiation pattern is shown in FIG. 22. Crossed dipoles are have orthogonal polarizations and could provide two independent data streams thus doubling the throughput that a single dipole could provide.

Additionally, there is at least one vertically polarized section 188, 190 (in this embodiment there are two). Thus, the complete antenna system has three orthogonal polarizations. The vertically polarized sections 188, 190 are comprised of the modified Yagi-Uda sections. They provide high directivity at low angles of elevation which is required to look forwards to independently provide the next handover and backwards to provide another traffic data-stream.

Figure 23:
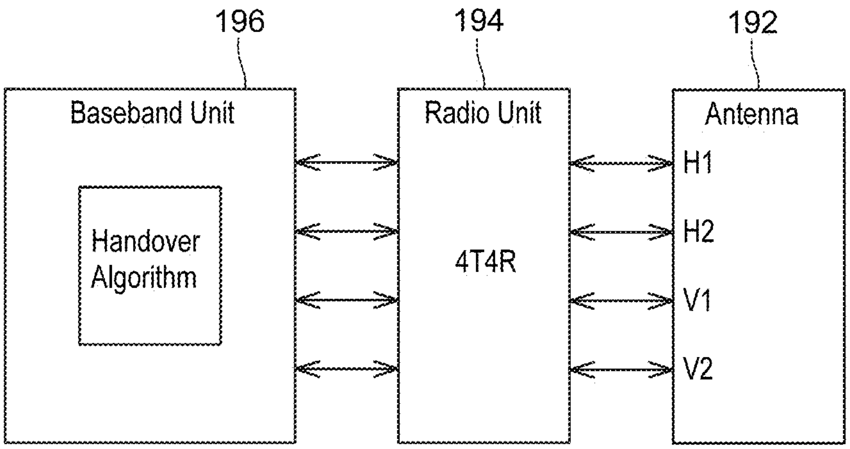
FIG. 23 shows schematically the system architecture for the present invention.

A typical system architecture outline is shown in FIG. 23. It comprises an antenna 192 with orthogonal horizontally polarized crossed dipole sections (H1 & H2) and two vertically polarized sections one pointing forward (V1), one aft (V2). Thus, the antenna has four ports. Each of these ports are connected to an independent radio section 194 often described as nTmR where n and m are the number of independent transmit and receive channels respectively.

Software, usually within the baseband unit 196, will arbitrate and control which streams are optimum to provide the highest data throughput and to manage handovers to the next tower in the chain.

So, this antenna 192 provides three orthogonal polarizations, is multi-section, has good low-angle performance and potentially provides several simultaneous data-streams to maximize data throughput on moving platforms such as aircraft.

The new antenna system has three orthogonal polarizations which helps with multiple streams to increase data throughput.

The antenna system has combined several different antennas with different radiation patterns which will insure both high gain at low angles needed for direct air to ground communications and when flying over the cell tower, in that flight paths are not fixed, however, the cell tower locations are.

The antenna system of the present invention further implements a folded monopole with several switched directors and reflectors which provides a low-cost solution to achieving beam steering to improve coverage, it is more power efficient and requires less weight.

Multiple antenna assemblies may be mounted on the aircraft to avoid aircraft roll shading and engine shading.

Multiple antennas within each assembly are able to communicate independently with several cell towers which increases data throughput and helps with cellular handovers.

The use of an end-fire ½ Yagi folded monopole antenna allows the antenna system to overcome low-angle gain problems.

Further, the antenna system of the present invention is small, easy to install and presents very low drag and has a low weight.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vehicle comprising:

a body, and an antenna system, the antenna system comprising:

a plurality of crossed dipole antennas arranged in an array and mounted to the body of the vehicle, configured and arranged to provide two orthogonal polarizations and supporting two spatial data streams, with a gain of at least +10 dB, two switched Yagi antenna arrays mounted to the body of the vehicle, configured and arranged to provide a third orthogonal polarization, and with each Yagi antenna array providing 180° azimuth coverage, with more than a +5 dB gain at an 5° elevation, and with each Yagi antenna array providing one data stream, wherein each switched Yagi antenna comprises:

a folded monopole extending from a body of the vehicle, which body is configured and arranged to act as a groundplane, a reflector positioned to one side of the folded monopole and also extending from the body of the vehicle, a set of one or more directors positioned opposite the one side of the folded monopole where the reflector is positioned, wherein the one or more directors, the folded monopole and the reflector form a linearly aligned array.

2. The vehicle to claim 1, wherein the vehicle is an aircraft.

3. The vehicle according to claim 2, wherein the aircraft has a longitudinal axis, further comprising:

a first of the one or more antennas mounted on a first portion of the aircraft, a second of the one or more antennas mounted on a second portion of the aircraft that is displaced along the longitudinal axis from the first portion, wherein although various components of the aircraft may shadow transmissions in certain areas from either one of the first or second antennas, the placement of the other of the first and second antennas will provide unshadowed transmissions to those certain areas.

4. The vehicle according to claim 3, wherein the first antenna is mounted forward of main wings of the aircraft and the second antenna is mounted rearward of the main wings.

5. The vehicle according to claim 2, wherein the aircraft has a longitudinal axis and a vertical center plane, a first of the one or more antennas mounted on a first lower portion of a fuselage of the aircraft positioned to one side of the vertical center plane, a second of the one or more antennas mounted on a second lower portion of the aircraft fuselage that is displaced to an opposite side of the vertical plane from the first portion.

6. The vehicle according to claim 5, wherein the first antenna is mounted at an angle of 15° on the other side of the vertical center plane of the aircraft.

7. The vehicle according to claim 1, wherein a second reflector is positioned to one side of the folded monopole, at an angle relative to a position of the first reflector, and a second set of one or more directors is positioned opposite the one side of the folded monopole where the second reflector is positioned, wherein the second set of one or more directors, the folded monopole and the second reflector form a linearly aligned array arranged at the angle relative to the first linearly aligned array formed by the first set of directors, the folded monopole and the first reflector.

8. The vehicle according to claim 7, wherein at least one RF switch is provided to connect either the first or second reflector and either the first or second set of one or more directors to the groundplane or to leave them in an open circuit.

9. An antenna system for a vehicle having a body comprising:

a plurality of crossed dipole antennas arranged in an array and mounted to the body of the vehicle, configured and arranged to provide two orthogonal polarizations and supporting two spatial data streams, with a gain of at least +10 dB, two switched Yagi antenna arrays mounted to the body of the vehicle, configured and arranged to provide a third orthogonal polarization, and with each Yagi antenna array providing 180° azimuth coverage, with more than a +5 dB gain at an 5° elevation, and with each Yagi antenna array providing one data stream.

10. The antenna system according to claim 9, further comprising:

a parasitic element configured and arranged relative to each of the dipole antennas to improve the bandwidth of the antenna system.

11. The antenna system according to claim 10, wherein the parasitic element is printed onto a printed circuit board.

12. The antenna system according to claim 9, wherein the vehicle is an aircraft and the body is a fuselage of the aircraft.

* * * * *